United States Patent [19]

Engel et al.

[11] 4,237,478
[45] Dec. 2, 1980

[54] I.C. CHROMA INJECTION AND DEMODULATION SYSTEM

[75] Inventors: Christopher M. Engel, Arlington Hts.; Gopal K. Srivastava, Mt. Prospect; George J. Tzakis, Chicago, all of Ill.

[73] Assignee: Zenith Radio Corporation, Glenview, Ill.

[21] Appl. No.: 32,318

[22] Filed: Apr. 23, 1979

[51] Int. Cl.³ .......................... H04N 9/50; H04N 9/52
[52] U.S. Cl. ......................................... 358/23; 358/25
[58] Field of Search ................................... 358/23, 25

[56] References Cited
U.S. PATENT DOCUMENTS 3,558,810  1/1971  Cecchin et al. ....................... 358/23

Primary Examiner—Robert L. Richardson

[57] ABSTRACT

An integrated injection and demodulation system is described for developing three color-difference signals in a color television receiver. To employ three separate demodulators, one for each color-difference signal, on a single integrated circuit chip without increasing the number of externally generated oscillator injection signals required, the system utilizes two such injection signals whose phases and amplitudes are such that their vector differences are employed to demodulate along one axis, and one of the injection signals is used to demodulate along a second axis. In addition, a fraction of one of the injected signals is developed inside the chip and vectorily subtracted from the other injection signal for demodulation by the resultant signal along the third color-difference axis.

13 Claims, 3 Drawing Figures

B-Y INJ. ANG. = 0° = $-V_2$
R-Y INJ. ANG. = 90° = $V_2 - V_1$
G-Y INJ. ANG. = 255° = $V_1 - V_3$

I.C. CHROMA INJECTION AND DEMODULATION SYSTEM

BACKGROUND OF THE INVENTION

This invention is directed generally to chroma demodulators for use in color television receivers, and particularly to chroma demodulators fabricated with integrated circuit technology.

Most modern color television receivers employ chroma demodulators that are built on an integrated circuit chip. In such demodulators, the incoming chroma signal is demodulated by utilizing a locally generated 3.58 MHz oscillator signal to develop the R-Y, B-Y, and G-Y color-difference signals. Typically, such demodulation is effected by including one pin on the chip to receive the chroma signals and two more input pins to receive oscillator injection signals of the proper phase for demodulating the R-Y and B-Y signals. The G-Y signal is then developed by suitably matrixing the R-Y signal with the B-Y signal.

An alternate demodulation system may employ three separate demodulators, one for each of the R-Y, B-Y and G-Y signals. By including a separate demodulator for the G-Y signal, it becomes more convenient to matrix the color-difference signals with the luminance (Y) signal on the same chip to produce the R, B, and G signals.

One drawback which exists when three separate demodulators are employed is that the demodulator chip must, at least according to existing technology, include yet another input pin for receiving an oscillator injection signal to demodulate the G-Y signal. The use of an additional pin on the chip necessarily increases its cost. Hence, employing existing oscillator injection methods for separately demodulating the R-Y, B-Y and G-Y signals is undesirable, if not impractical.

OBJECTS OF THE INVENTION

It is a general object of the invention to provide an improved system for demodulating chroma signals in a color television receiver.

It is a more specific object of the invention to provide a system for separately demodulating the R-Y, B-Y and G-Y color-difference signals on a single integrated circuit chip while employing the same number of input pins as conventional two-demodulator chips.

BRIEF DESCRIPTION OF THE FIGURES

The objects stated above and other objects of the invention are more particularly set forth in the following detailed description and in the accompanying drawings, of which.

SUMMARY OF THE INVENTION

Broadly stated, the invention provides an injection and chroma demodulation system for fabrication on an integrated circuit wherein only two integrated circuit pins are required to supply the demodulator with three different injection signals for separate demodulation of three color-difference signals. Toward this end, two injection signals, developed externally of the chip, are selected such that the first of the injection signals has a phase vector oriented along the desired demodulation axis of one of the color-difference signals. In the preferred embodiment, the phase vector of the first injection signal is oriented along the B-Y demodulation axis. The second injection signal is selected such that a vector comprising the vector difference of the first injection signal minus the second injection signal is oriented along the demodulation axis of a second color-difference signal, and such that a vector comprising the vector difference of the second injection signal minus a selected fraction of the first injection signal is oriented along the demodulation axis of a third color-difference signal. For example, where the first injection signal has a phase corresponding to the direction of the minus B-Y axis (180°), the second injection signal may have a phase of about 225°. By appropriate selection of the magnitude of the second injection signal, the vector difference between the first and second injection signals will be directed along the R-Y axis. In addition, a fraction of the first injection signal may be developed by a voltage divider internal to the chip to define a third injection signal. The vector difference between the second and third injection signals then lies along the G-Y axis for demodulation of the G-Y color-difference signal.

The three injection signals are applied in combination to three separate demodulators for developing the R-Y, B-Y and G-Y color-difference signals. In the preferred embodiment, the three demodulators are in the form of pairs of differential amplifiers coupled in a doubly-balanced arrangement.

DESCRIPTION OF THE PREFERRED EMBODIMENT

Figure 1:
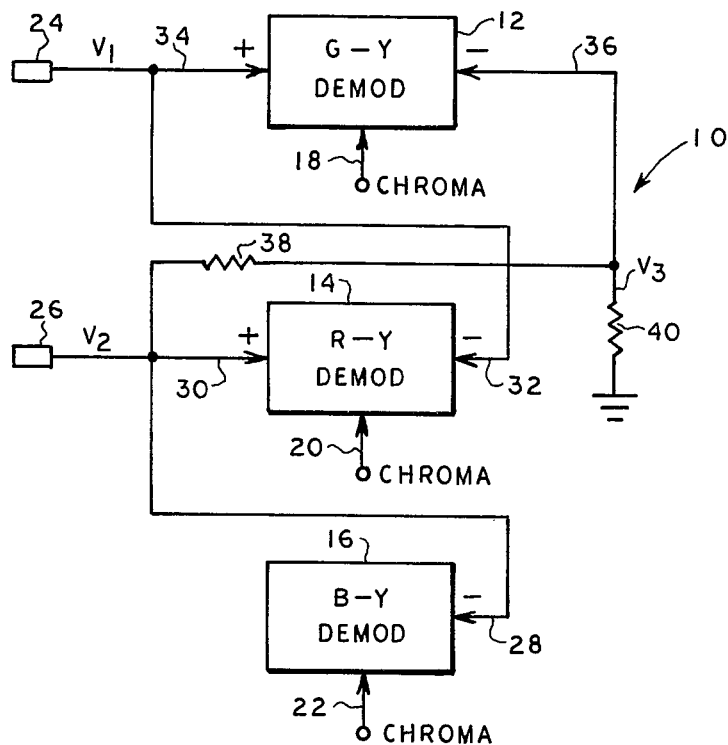
FIG. 1 is a simplified schematic diagram of an injection and demodulation system embodying various aspects of the invention.

Referring now to FIG. 1, there is shown a highly schematic diagram, partly in block form, of a demodulator injection and demodulation system 10 embodying various aspects of the invention. The system 10 preferably includes three demodulators on the same integrated circuit chip, a G-Y demodulator 12, an R-Y demodulator 14, and a B-Y demodulator 16. The demodulators have respective inputs 18, 20 and 22 for receiving the chroma signal which is to be demodulated. Each of the three demodulators also receives one or more 3.58 MHz oscillator injection signals which are developed in the receiver and synchronized to the 3.58 MHz burst signal.

Two of the injection signals applied to the demodulators are developed externally of the integrated circuit and applied to input pins 24 and 26 of the integrated circuit. Specifically, an injection signal $V_1$ is applied to input pin 24 and an injection signal $V_2$ is applied at pin 26. By selective choice of the signals $V_1$ and $V_2$, as described below, the three demodulators demodulate their received chroma signals without the need of another, externally applied injection signal. Hence, no more input pins are required.

Referring to the B-Y demodulator 16, it receives the injection signal $V_2$ from pin 26 at its input terminal 28 for developing a B-Y color-difference signal. The R-Y demodulator 14 receives the injection signal $V_2$ at its input terminal 30 and the injection signal $V_1$ at its other input terminal 32. The G-Y demodulator receives the signal $V_1$ at its input terminal 34 and another injection signal $V_3$ at its input terminal 36. As shown, the injection signal $V_3$ is a selected fraction of the signal $V_2$ and is preferably developed by an internal voltage divider, resistors 38 and 40, coupled between pin 26 and ground.

As shown by the plus and minus symbols adjacent the injection inputs of the three demodulators, each demodulator demodulates its received chroma signal along a demodulation axis corresponding to the direction of the vector difference of its injection signals. For example, the R-Y demodulator demodulates along an axis defined by the vector difference of $V_2$ minus $V_1$. In like manner, the G-Y demodulator demodulates along an axis defined by the vector difference of $V_1-V_3$. The B-Y demodulator demodulates along an axis defined by the vector of minus $V_2$.

Figure 2:
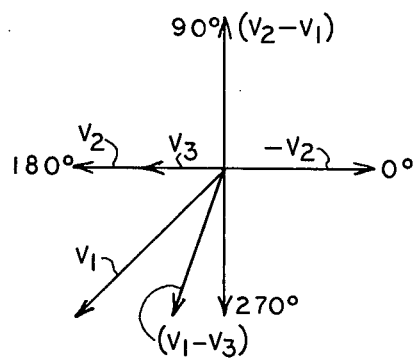
FIG. 2 is a vector diagram illustrating the preferred phases and magnitudes of the injection voltages employed in the system of FIG. 1.

FIG. 2 shows a preferred relationship between the signals $V_1$ and $V_2$ which permits the use of three separate demodulators and only two oscillator injection pins. As shown, the signals $V_1$ and $V_2$ are depicted as vectors in a vector diagram in which the B-Y demodulation axis is at zero degrees, the R-Y axis is at 90°, and the G-Y axis is at about 255°. To demodulate along these axes, the signal $V_2$ is preferably selected to be oriented along one of the demodulation axes, the B-Y axis in this example, although the vector $V_2$ actually points in the direction of the minus B-Y axis (180°).

The vector $V_1$ has a phase between that of the minus B-Y axis and the G-Y axis, and is selected to have a phase and amplitude such that a vector comprising the vector difference of $V_2-V_1$ lies along another demodulation axis. As shown, the vector $V_2-V_1$ has a phase angle of 90° and lies along the R-Y axis.

A further requirement of the vectors $V_1$ and $V_2$ is that their magnitudes and phases be such that a vector comprising the vector $V_1$ minus a selected fraction of the vector $V_2$ lies along a third (G-Y) demodulation axis. That selected fraction of $V_2$ is shown as another vector $V_3$ which is in phase with the vector $V_2$ but which has a smaller magnitude. By properly selecting the magnitudes and phases of the vectors $V_1$ and $V_2$, the vector difference $(V_1-V_3)$ is oriented along the G-Y axis, at approximately 255°.

Referring to FIGS. 1 and 2, it can be seen that a G-Y color difference signal will be developed by the demodulator 12 if it is adapted to demodulate its received chroma signal along an axis defined by the vector difference of $V_1-V_3$. A similar demodulator 14 will develop an R-Y color-difference signal along an axis defined by the vector difference $V_2-V_1$. The B-Y demodulator operates in a similar manner, demodulating along the minus $V_2$ axis.

A preferred form of demodulator for effecting the functions described above is shown in FIG. 3. In this embodiment, the signals $V_1$ and $V_2$ are developed by applying a 3.58 MHz oscillator signal to a terminal 42, from which the oscillator signal is coupled through a coil 44 to pin 24. Pin 24 is connected by a first impedance in the form of a resistor 46 to pin 26, the latter pin being coupled to ground through a second impedance in the form of a reactive element (capacitor) 48. The values of the coil 44, the resistor 46, and the capacitor 48 are selected to cause the vectors of signals $V_1$ and $V_2$ to have the magnitudes and phases shown in FIG. 2.

The G-Y demodulator 12 includes a left differential amplifier comprising a pair of emitter-coupled transistors 50 and 52, and a right differential amplifier comprising another pair of emitter-coupled transistors 54 and 56. The emitters of the transistors 50 and 52 receive a chroma signal current from a current source in the form of a transistor 58. In like manner, the emitters of the transistors 54 and 56 receive a chroma signal current from another current source in the form of a transistor 60. As shown, the transistors 58 and 60 are coupled together as a differential amplifier with another transistor 62 which acts as the current source for this latter differential amplifier. Bias for the transistor 62 may be provided by any conventional bias supply (not shown).

The input to the differential amplifier comprising transistors 58-62 is at a terminal 64 to which the chroma signal is applied. With the terminal 64 coupled to the base of the transistor 58 as shown, and with the bases of the transistors 58 and 60 coupled to a bias source Vbl, conventional differential amplifier operation is effected. That is, the transistor 58 supplies a chroma signal current of one polarity to the transistors 50 and 52, and the transistor 60 supplies a chroma signal current of the opposite polarity (reversed in phase by 180°) to the transistors 54 and 56.

To obtain demodulation of the G-Y signal along the proper axis as described above and to eliminate switching transients as the transistors 50-56 turn off and on, the latter transistors are mutually coupled in a so-called doubly balanced configuration. In this arrangement, the collectors of the transistors 52 and 56 are both coupled to a G-Y load resistor 66, and the collectors of the transistors 50 and 54 are coupled to a voltage source. In addition, the injection signal $V_1$ is applied to the bases of the transistors 50 and 56, while the injection signal $V_3$ (developed across the resistor 40) is applied to the bases of the transistors 52 and 54. With the left differential amplifier (transistors 50 and 52) of the G-Y demodulator receiving a chroma signal current of opposite polarity to that received by its right differential amplifier (transistors 54 and 56), a positive demodulation output, plus G-Y, is developed across the load resistor 66.

To further illustrate how positive demodulation of the G-Y signal occurs along its proper axis (255°), one cycle of chroma signal current is shown adjacent the collectors of the transistors 58 and 60, and one cycle of injection voltage is shown at the base of the transistor 52. It is assumed for purposes of this discussion that the chroma signal current corresponds to a G-Y signal.

The cycle of injection voltage shown at the base of the transistor 52 represents the effective voltage across its base-emitter junction. That effective voltage is the resultant of $V_3$ minus $V_1$. The voltage across the base-emitter junction of the transistor 56 is $V_1-V_3$. Hence, the transistors 52 and 56 conduct on alternate half-cycles of the injection voltages.

On the first half-cycle of the chroma signal current, the transistor 52 is turned off by its effective injection voltage, but the transistor 56 is turned on, thereby coupling the first half-cycle of the chroma signal current to the collector of the transistor 56. The resultant voltage across the load resistor 66 is a positive half-cycle of chroma signal.

On the second half-cycle of the chroma signal current, the transistor 56 turns off and the transistor 52 turns on. As a result, the transistor 52 couples the second half-cycle of chroma signal current to the load resistor 66, across which a positive half-cycle of chroma voltage is developed. Hence, positive demodulation of the G-Y chroma signal is achieved, such demodulation being effected along the axis defined by the vector difference of $V_1$ minus $V_3$.

Referring now to the R-Y demodulator 14, it also includes left and right differential amplifiers. The left differential amplifier includes emitter-coupled transistors 68 and 70, while the right differential amplifier includes emitter-coupled transistors 72 and 74. As shown, the latter differential amplifiers are coupled to a load resistor 76 and arranged in a doubly-balanced configuration as described above. The chroma signal current is applied to the transistors 68-74 by a chroma source 78 which may be similar to the arrangement of transistors 58, 60, and 62.

To effect demodulation of the R-Y signal along its proper axis, the injection signal $V_2$ is applied to the bases of the transistors 68 and 74 while the injection signal $V_1$ is applied to the bases of the transistors 70 and 72. Hence, the resultant injection voltage across the base-emitter junction of the transistor 70 is $V_2$ minus $V_1$. Thus, the transistors 70 and 74 conduct on alternate half-cycles of the R-Y chroma signal to develop across the load resistor 76 a positive demodulation signal along the axis of the vector $V_2-V_1$ (FIG. 2).

The B-Y demodulator 16 is constructed in the same manner as the R-Y and G-Y demodulators. A left differential amplifier includes transistors 80 and 82, and a right differential amplifier includes transistors 84 and 86, all of which are coupled in the doubly-balanced configuration with a load resistor 88. The chroma signal current is applied to the transistors 80-86 by a chroma source 90 which may also be similar to the arrangement of transistors 58, 60 and 62.

Demodulation of the B-Y chroma signal along its proper axis is effected by applying the injection signal $V_2$ to the bases of the transistors 82 and 84. Because the signal $V_2$ lies along the B-Y axis, no further injection signal is needed for the B-Y demodulator. The bases of the transistors 80 and 86 are merely coupled to a d.c. bias Vb.

In the manner previously described, the transistors 82 and 86 conduct on alternate half-cycles of the injection voltage to develop a positive B-Y demodulation voltage across the load resistor 88.

By employing the type of doubly-balanced demodulators shown, and by coupling the necessary injection voltages to one transistor in the left differential amplifier of a demodulator and to one transistor in the right differential amplifier, a very satisfactory demodulator is provided. The choice of injection voltages as described above permit the use of but two injection input pins to the demodulator chip, and yet separate demodulation is effected for each of the three color-difference signals. Similar results are obtained when the phases of the signals $V_1$ and $V_2$ are reversed by 180 degrees and the demodulator inputs are reversed. With the ability to so separately demodulate the three color-difference signals, it becomes more convenient to matrix them with the luminance signal on the same chip in which demodulation occurs. Thus, pin numbers can be kept low while yet providing a more complex demodulator chip.

Figure 3:
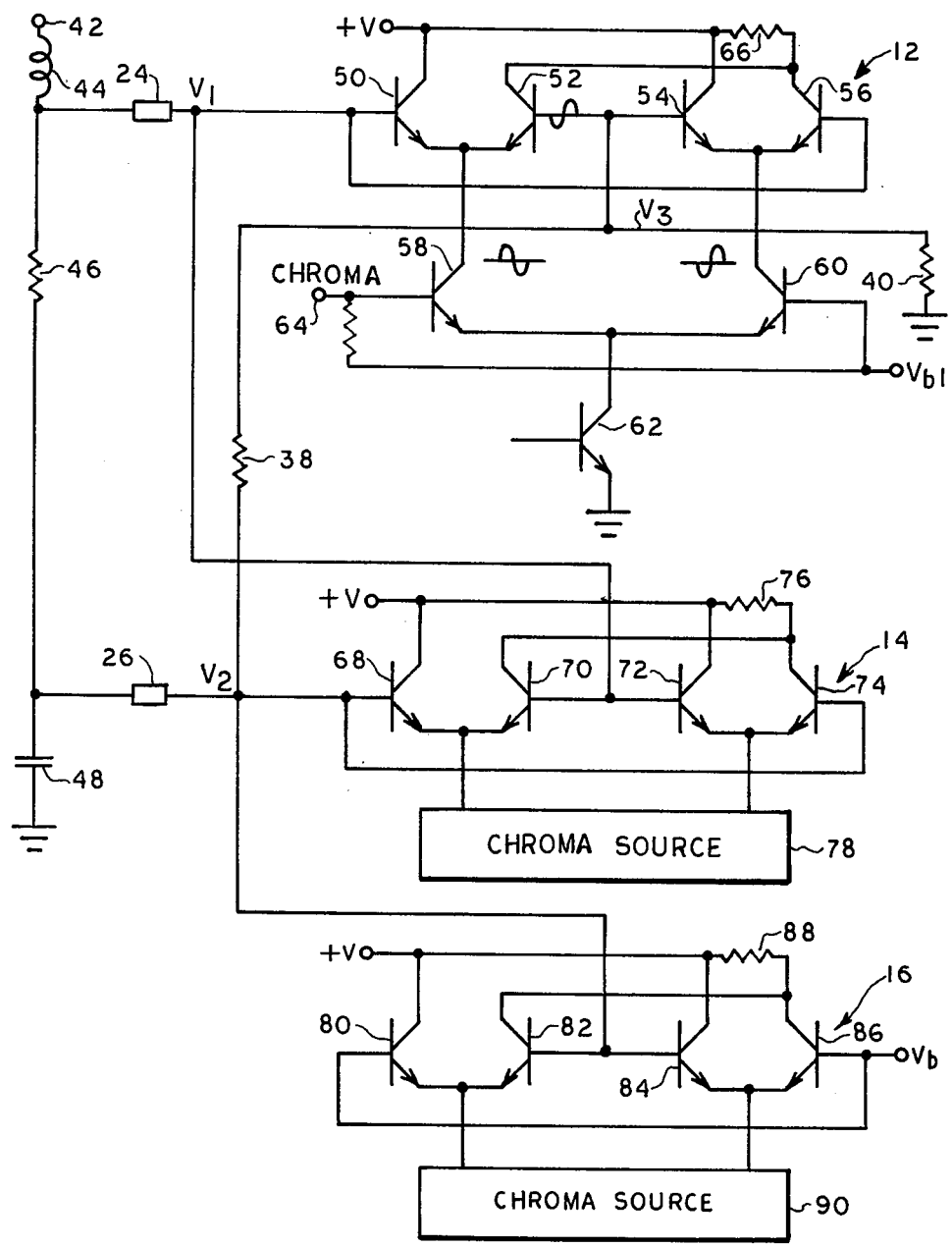
FIG. 3 is a detailed schematic diagram illustrating a preferred embodiment of the system of FIG. 1.

Although the invention has been described in terms of a preferred demodulator structure and preferred injection voltages, it will be apparent to those skilled in the art that many modifications and variations thereto may be made without departing from the invention. For example, the demodulator structure may be modified while still employing the disclosed injection system wherein only two pins are needed to develop three injection signals. Also, the specific magnitudes and phases of the two injected signals may be varied to suit particular applications. For example, where it is desired to obtain some degree of automatic tint control, the angle between the R-Y demodulator axis and the B-Y demodulator axis may be increased to greater than 90° by increasing the phase angle of $V_1$. This may be accomplished by placing a suitable reactance in series with the resistor 46 (FIG. 3). Compensation for the change in the demodulation axis of the G-Y signal may be effected by changing the magnitude of $V_3$. A degree of automatic tint control may also be obtained by attenuating the level of $V_1$ before it is applied to the R-Y demodulator. Many other such obvious modifications may be made without departing from the invention. It is intended, therefore, that all such modifications and variations be included within the spirit and scope of the invention as defined by the appended claims.

What is claimed is:

1. In an integrated circuit receiving chroma and oscillator injection signals for developing three color-difference signals, an injection and demodulation system, comprising:

means external to the integrated circuit for applying thereto, via a first input pin, a first oscillator injection signal whose phase vector is oriented along the demodulation axis of a selected color-difference signal;

means external to the integrated circuit for applying thereto, via a second input pin, a second oscillator injection signal whose magnitude and phase is selected such that a signal vector comprising the vector difference of said first injection signal minus said second injection signal is oriented along the demodulation axis of a second color-difference signal, and such that a signal vector comprising the vector difference of said second injection signal minus a selected fraction of said first injection signal is oriented along the demodulation axis of a third color-difference signal;

means located on the integrated circuit and receiving the first injection signal for developing a third injection signal comprising said selected fraction of said first injection signal;

first demodulator means disposed on the integrated circuit, receiving a chroma signal, said second injection signal, and said third injection signal, and adapted to demodulate its received chroma signal along the axis of the vector difference of the second injection signal minus the third injection signal;

second demodulator means disposed on the integrated circuit, receiving a chroma signal, said first injection signal and said second injection signal, and adapted to demodulate its received chroma signal along the axis of the vector difference to the first injection signal minus said second injection signal;

third demodulator means disposed on the integrated circuit, receiving a chroma signal and the first injection signal, and adapted to demodulate its received chroma signal along the axis of said first injection signal;

whereby the chroma signal is demodulated to develop three color-difference signals by utilizing only two input pins for applying the injection signals to the integrated circuit.

2. A system as set forth in claim 1 wherein the phase of the first injection signal is selected to be in the direction of the negative B-Y axis and the phase of the second injection signal is selected to be between the negative B-Y axis and the G-Y axis.

3. A system as set forth in claim 2 wherein the magnitude and phase of the second injection signal is such that the vector comprising the vector difference of the first injection signal minus the second injection signal lies along the R-Y axis.

4. A system as set forth in claim 3 wherein the selected fraction of the first injection signal is such that the third injection signal lies along the G-Y axis.

5. A system as set forth in claim 1 wherein said means for applying the second injection signal to the integrated circuit includes a first impedance coupled between said first and second input pins and a second impedance coupled between said second input pin and ground.

6. A system as set forth in claim 5 wherein said first impedance includes a resistance and said second impedance includes a reactive element.

7. A system as set forth in claim 1 wherein said first, second and third demodulator means each includes a left and right differential amplifier mutually coupled in a doubly-balanced configuration.

8. A system as set forth in claim 7 wherein each differential amplifier includes a pair of emitter-coupled transistors, wherein the emitters of each left differential amplifier receive a chroma current signal of a given polarity, and wherein the emitters of each right differential amplifier receive a chroma current signal of an opposite polarity.

9. A system as set forth in claim 8 wherein said first demodulator means comprises a G-Y demodulator receiving the second injection signal at the base of one of the transistors in its left differential amplifier and at the base of one of the transistors in its right differential amplifier, and receiving the third injection signal at the base of one of the transistors in its left differential amplifier and at the base of one of the transistors in its right differential amplifier.

10. A system as set forth in claim 9 wherein said first injection signal is selected to lie along the B-Y axis and the second injection signal is selected to have a phase of approximately 225°.

11. A system as set forth in claim 9 wherein said second demodulator means comprises the R-Y demodulator receiving the first injection signal at the base of one of the transistors in its left differential amplifier and at the base of one of the transistors in its right differential amplifier, and receiving the second injection signal at the base of one of the transistors in its left differential amplifier and at the base of one of the transistors in its right differential amplifier.

12. A system as set forth in claim 9 wherein said third demodulator means comprises a B-Y demodulator receiving the first injection signal at the base of one of the transistors in its left differential amplifier and at the base of one of the transistors in its right differential amplifier, the bases of the other transistors in its left and right differential amplifier being coupled together and receiving no injection signal.

13. In an integrated circuit receiving chroma and oscillator injection signals for developing three color-difference signals, an injection and demodulation system, comprising:

means external to the integrated circuit for applying thereto, via a first input pin, a first oscillator injection signal whose phase vector is oriented in the direction of the minus B-Y axis;

means external to the integrated circuit for applying thereto, via a second input pin, a second oscillator injection signal whose magnitude and phase is selected such that a signal vector comprising the vector difference of the first injection signal minus the second injection signal is oriented along the R-Y axis, and such that a signal vector comprising the vector difference of the second injection signal minus a selected fraction of the third injection signal is oriented along the G-Y axis;

a G-Y demodulator, an R-Y demodulator, and a B-Y demodulator, each of said demodulators comprising left and right differential amplifiers mutually coupled in a doubly-balanced configuration, and each of said differential amplifiers having a pair of emitter-coupled transistors;

means for coupling the emitters of each left differential amplifier to a source of chroma signal current of a selected phase and for coupling the emitters of each right differential amplifier to a source of chroma signal current of an opposite phase;

means for coupling the second injection signal to the base of one transistor in the left differential amplifier of the G-Y demodulator and to the base of one transistor in the right differential amplifier of the G-Y demodulator;

means for coupling said selected fraction of the first injection signal to the base of one transistor in the left differential amplifier of the G-Y demodulator and to the base of one transistor in the right differential amplifier of the G-Y demodulator;

means for coupling the first injection signal to the base of one transistor of the left differential amplifier of the R-Y demodulator and to the base of one transistor of the right differential amplifier of the R-Y demodulator;

means for coupling the second injection signal to the base of one transistor of the left differential amplifier of the R-Y demodulator and to the base of one transistor of the right differential amplifier of the R-Y demodulator; and means for coupling the first injection signal to the base of one transistor of the left differential amplifier of the B-Y demodulator and to the base of one transistor of the right differential amplifier of the B-Y demodulator;

whereby the chroma signal is demodulated to develop three color-difference signals by utilizing only two pinput pins for applying the injection signals to the integrated circuit.

* * * * *